United States Patent
Wendt et al.

(10) Patent No.: US 9,887,538 B2
(45) Date of Patent: Feb. 6, 2018

(54) DC POWER DISTRIBUTION SYSTEM

(71) Applicant: PHILIPS LIGHTING HOLDING B.V., Eindhoven (NL)

(72) Inventors: Matthias Wendt, Würselen (DE); Michael Alex Van Hartskamp, Eindhoven (NL); Maurice Herman Johan Draaijer, Ittervoort (NL); Manuel Eduardo Alarcon-Rivero, Delft (NL); Bozena Erdmann, Aachen (DE)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 301 days.

(21) Appl. No.: 14/420,809

(22) PCT Filed: Aug. 6, 2013

(86) PCT No.: PCT/IB2013/056430
§ 371 (c)(1),
(2) Date: Feb. 10, 2015

(87) PCT Pub. No.: WO2014/027277
PCT Pub. Date: Feb. 20, 2014

(65) Prior Publication Data
US 2015/0207315 A1 Jul. 23, 2015

Related U.S. Application Data

(60) Provisional application No. 61/682,802, filed on Aug. 14, 2012.

(51) Int. Cl.
*H02J 1/00* (2006.01)
*H02J 9/00* (2006.01)

(52) U.S. Cl.
CPC ............... *H02J 1/00* (2013.01); *H02J 9/005* (2013.01); *Y10T 307/832* (2015.04)

(58) Field of Classification Search
CPC .................................................. H02J 1/00
See application file for complete search history.

(56) References Cited

U.S. PATENT DOCUMENTS

| 2004/0044914 A1 | 3/2004 | Gedeon |
| 2004/0061380 A1 | 4/2004 | Hann et al. |

(Continued)

FOREIGN PATENT DOCUMENTS

| JP | 2002540521 A | 11/2002 |
| JP | 2007236047 A | 9/2007 |

(Continued)

*Primary Examiner* — Jeffrey Shin
(74) *Attorney, Agent, or Firm* — Meenakshy Chakravorty

(57) ABSTRACT

The invention relates to a DC power distribution system for distributing DC power from a power supply device (3) to an electrical device (2). The power supply device is operable in a high power mode or in a low power mode for supplying a higher power or a lower power, respectively, to the electrical device via an electrical conductor (4), wherein the electrical device is switchable between a high power mode and a low power mode in which the electrical device consumes more power or less power, respectively. An electrical device control unit (11) controls the mode of the electrical device depending on the power supplied by the power supply device. This automatic control of the electrical device depending on the provided power can lead to a better balance between the power consumption and the power supply and, thus, to an improved efficiency of supplying power to the electrical device.

15 Claims, 7 Drawing Sheets

(56) References Cited

U.S. PATENT DOCUMENTS

| | | |
|---|---|---|
| 2008/0307242 A1 | 12/2008 | Qu |
| 2009/0224603 A1* | 9/2009 | Perper ..................... G06F 1/26 |
| | | 307/43 |
| 2009/0251072 A1 | 10/2009 | Barnett et al. |
| 2010/0164450 A1 | 7/2010 | Dishman et al. |
| 2011/0107128 A1 | 5/2011 | Otani et al. |
| 2011/0140519 A1 | 6/2011 | Lo et al. |
| 2012/0181853 A1 | 7/2012 | Polese |
| 2013/0086284 A1* | 4/2013 | Shaver ................... G06F 1/266 |
| | | 710/18 |
| 2013/0339757 A1* | 12/2013 | Reddy .................. G06F 1/3212 |
| | | 713/300 |

FOREIGN PATENT DOCUMENTS

| | | |
|---|---|---|
| WO | 2010149205 A1 | 12/2010 |
| WO | 2012007055 A1 | 1/2012 |
| WO | 2013038339 A1 | 3/2013 |
| WO | 2013093814 A2 | 6/2013 |
| WO | 2013093875 A1 | 6/2013 |
| WO | 2013098722 A1 | 7/2013 |
| WO | 2013098744 A2 | 7/2013 |
| WO | 2013124779 A1 | 8/2013 |
| WO | 2014027291 A2 | 2/2014 |

* cited by examiner

DC POWER DISTRIBUTION SYSTEM

CROSS-REFERENCE TO PRIOR APPLICATIONS

This application is the U.S. National Phase application under 35 U.S.C. § 371of International Application No. PCT/IB13/056430, filed on Aug. 6, 2013, which claims the benefit of U.S. Provisional Patent Application No. 61/682,802, filed on Aug. 14, 2012. These applications are hereby incorporated by reference herein.

FIELD OF THE INVENTION

The invention relates to a direct current (DC) power distribution system and a DC power distribution method for distributing DC power from a power supply device to an electrical device. The invention relates further to an electrical device and an electrical conductor for being used in the DC power distribution system.

BACKGROUND OF THE INVENTION

A DC power distribution system is defined by, for instance, the EMerge Alliance Occupied Space standard. Currently, in a DC power distribution system in accordance with the EMerge standard power bars are always powered at a nominal voltage, even if there is only a very small fraction of load compared to nominal load conditions. Thus, even if electrical devices connected to the power bars are able to manage a standby mode, in which only very little power is consumed by the electrical devices, a power supply device of the DC power distribution system supplies the nominal voltage such that the power supply device is operated in an unfavorable point of operation, at which the efficiency of power supply is very low, for example, below ten percent.

SUMMARY OF THE INVENTION

It is an object of the present invention to provide a DC power distribution system and a DC power distribution method for distributing DC power to electrical devices, wherein the efficiency of supplying power to the electrical devices can be improved. It is a further object of the present invention to provide an electrical device and an electrical conductor, which can be used in the DC power distribution system such that the efficiency of supplying power can be improved.

In a first aspect of the present invention a DC power distribution system for distributing DC power from a power supply device to an electrical device is presented, wherein the DC power distribution system comprises:

an electrical conductor for conducting DC power from the power supply device to the electrical device, the power supply device for supplying DC power to the electrical device via the electrical conductor, wherein the power supply device is operable in a high power mode, in which a higher power is supplied to the electrical device via the electrical conductor, and in a low power mode, in which a lower power is supplied to the electrical device via the electrical conductor, the electrical device for receiving DC power from the electrical conductor, wherein the electrical device is switchable between a high power mode, in which the electrical device consumes more power, and a low power mode, in which the electrical device consumes less power, wherein the electrical device comprises an electrical device control unit for controlling the mode of the electrical device depending on the power supplied by the power supply device.

Since the electrical device is controlled depending on the power on the electrical conductor supplied by the power supply device, the electrical device can be switched into, for instance, the low power mode, if the lower power is supplied, and into the high power mode, if the higher power is supplied. The electrical device can therefore automatically be controlled depending on the actually supplied power. This can lead to a better balance between the power consumption and the power supply and, thus, to an improved efficiency of supplying power to the electrical device.

The electrical conductor can be regarded as being a power bar of the DC power distribution system.

The DC power distribution system can comprise one or more of the electrical devices. The electrical device can be, for instance, a lighting device like a lamp, a sensor like a presence sensor for detecting persons in a room, a loud speaker, et cetera. The power supply device comprises preferentially one or several power supplies being power converters for converting alternating current (AC) power to the respective DC power. The DC power distribution system can be installed, for instance, in a building, in particular, at a ceiling of a room for, for example, illuminating the room, if at least some of the electrical devices are lamps. The DC power distribution system can therefore be a lighting system of a building.

It is preferred that the higher power is a nominal power of the DC power distribution system and the lower power is standby power of the DC power distribution system. The power supply device can be output voltage controlled, wherein for supplying the nominal power a nominal voltage of, for instance, 24 V and for supplying the standby power a standby voltage of, for example, 5 V can be provided. The standby voltage is sufficient, if the DC power distribution system is in a standby situation, in which power is substantially not consumed. The DC power distribution system can therefore be adapted to handle standby situations, in which no substantial load may be present, with improved power supply efficiency. Correspondingly, the low power mode of the electrical device is preferentially a standby mode of the electrical device and the high power mode of the electrical device is preferentially an active mode of the electrical device, in which the electrical device may be fully operational.

The electrical device may comprise a measuring unit for measuring the power supplied by the power supply device, wherein the electrical device control unit can be adapted to control the mode of the electrical device depending on the measured supplied power. Thus, the electrical device can be automatically controlled in a technically relatively simple way depending on the measured power on the electrical conductor supplied by the power supply device. The measuring unit is, for example, a unit for measuring the current, if the power supply device is output voltage controlled.

In an embodiment the power supply device comprises a high power supply for supplying the higher power to the electrical conductor and a low power supply for supplying the lower power to the electrical conductor, wherein in the high power mode the high power supply supplies the higher power and in the low power mode the low power supply supplies the lower power. In particular, in the low power mode the high power supply may be completely switched off. Thus, in an embodiment the switchability of the supplied power can be provided in a technically relatively simple way by using different power supplies. In another embodiment the power supply device may comprise a power supply having a controllable output power to be supplied to the electrical conductor for supplying the higher power in the high power mode and the lower power in the low power mode.

In a further embodiment the power supply device comprises a high power supply for supplying the higher power to the electrical conductor and a low power supply for supplying the lower power to the electrical conductor, wherein in the high power mode the high power supply supplies the higher power and the low power supply supplies the lower power and wherein in the low power mode the low power supply supplies the lower power. Thus, in this embodiment only the high power supply needs to be switched, therefore providing the controllable power supply device in an even more technically simple way.

In an embodiment the low power supply and the high power supply are in different housings. This allows installing the DC power distribution system in a more variable way, which may lead to a simplified installation of the DC power distribution system.

The low power supply may be connected to the electrical conductor via an electrical control element like a diode, wherein the electrical control element may be integrated in an electrical conductor connector for connecting the electrical conductor with the low power supply. This simplifies the installation of the DC power distribution system, if an electrical control element should be electrically connected between the low power supply and the electrical conductor.

The electrical control element is preferentially a diode. However, it can also be another electrical control element like a controlled switching element. For instance, it can be a switch with a sensing circuit measuring the direction of current flow and controlling the switch, which may be an FET, depending on the measured direction of current flow, especially in the same way like a diode.

The DC power distribution system may comprise several electrical conductors, wherein the low power supply may be connected to the several electrical conductors in a bus or star configuration. The several electrical conductors can be separately connected to the high power supply and parallely connected to the low power supply. For instance, each electrical conductor may be separately connected to the high power supply each with a power limitation, especially with a power limitation of about 100 W in accordance with the UL-Class2 limitation of the EMerge Alliance Occupied Space standard, wherein the electrical conductors can be connected in parallel to the low power supply, which may be separate from the high power supply. Per electrical conductor a diode may be present between the respective electrical conductor and the low power supply. However, instead of the diode also another electrical control element may be used like a relay or a semiconductor switch.

Moreover, the power supply device may comprise a power consumption detection unit for detecting the power consumed on the electrical conductor and a power supply control unit for controlling the power mode of the power supply device depending on the detected consumed power. The power supply control unit can comprise switching rules defining a switching operation depending on the detected power consumption. For instance, the power supply device can be switched into the low power mode, if the power consumption detection unit detects a power consumption being smaller than a predefined threshold. The switching rules can also consider further aspects like timing.

The DC power distribution system may comprise a switching control unit for switching the electrical device. For instance, ZigBee may be used for switching individual electrical devices on and off.

Preferentially, the DC power distribution system comprises several electrical conductors, wherein the power supply device is adapted to supply power to one or several of the electrical conductors independently from supplying power to the other of the electrical conductors. This further increases the adaptability of the power supply to the actual power consumption situation in the DC power distribution system.

In an embodiment the electrical conductor comprises a first sub conductor for conducting the higher power and a second sub conductor for conducting the lower power. For instance, the electrical conductor can comprise a first sub conductor being a first metallic element like a first wire for providing the higher power, for instance, a nominal voltage, and a second sub conductor being a second metallic element like a second wire for providing the lower power, for instance, a standby voltage. Using this electrical conductor with separated electrical sub conductors for guiding different powers can technically simplify the DC power distribution system and simplify an installation of this system.

The power supply device can be adapted to supply a further power, wherein the electrical conductor may comprise a further sub conductor for conducting the further power. Thus, the electrical conductor can be used to supply several different powers. For instance, the first sub conductor can be used for supplying a nominal power, the second sub conductor can be used for supplying a first standby power and the third sub conductor can be used for supplying a second standby power. For example, the power supply device can be output voltage controlled and the nominal voltage can be 24 V, the first standby voltage can be 5 V and the second standby voltage can be 3.3 V, wherein these voltages can be supplied by using the same electrical conductor, in particular simultaneously.

In a further aspect of the present invention an electrical device for receiving DC power from an electrical conductor of the DC power distribution system is presented, wherein the electrical device is switchable between a high power mode, in which the electrical device consumes more power, and a low power mode, in which the electrical device consumes less power, wherein the electrical device comprises an electrical device control unit for controlling the mode of the electrical device depending on the power on the electrical conductor.

In a further aspect of the present invention an electrical conductor for conducting DC power from a power supply device to an electrical device in the DC power distribution system is presented, wherein the electrical conductor comprises a first sub conductor for conducting the higher power and a second sub conductor for conducting the lower power.

In a further aspect of the present invention a DC power distribution method for distributing DC power from a power supply device to an electrical device is presented, wherein the DC power distribution method comprises:

supplying DC power to the electrical device via an electrical conductor by the power supply device, wherein the power supply device is operable in a high power mode, in which the higher power is supplied to the electrical device via the electrical conductor, and in a low power mode, in which the lower power is supplied to the electrical device via the electrical conductor, receiving DC power from the electrical conductor by the electrical device, wherein the electrical device is switchable between a high power mode, in which the electrical device consumes more power, and a low power mode, in which the electrical device consumes less power, wherein the mode of the electrical device is controlled by an electrical device control unit depending on the power supplied by the power supply device.

It shall be understood that the DC power distribution system of claim 1, the electrical device of claim 13, the electrical conductor of claim 14 and the DC power distribution method of claim 15 have similar and/or identical preferred embodiments, in particular, as defined in the dependent claims.

It shall be understood that a preferred embodiment of the invention can also be any combination of the dependent claims with the respective independent claim.

These and other aspects of the invention will be apparent from and elucidated with reference to the embodiments described hereinafter.

DETAILED DESCRIPTION OF EMBODIMENTS

Figure 1:
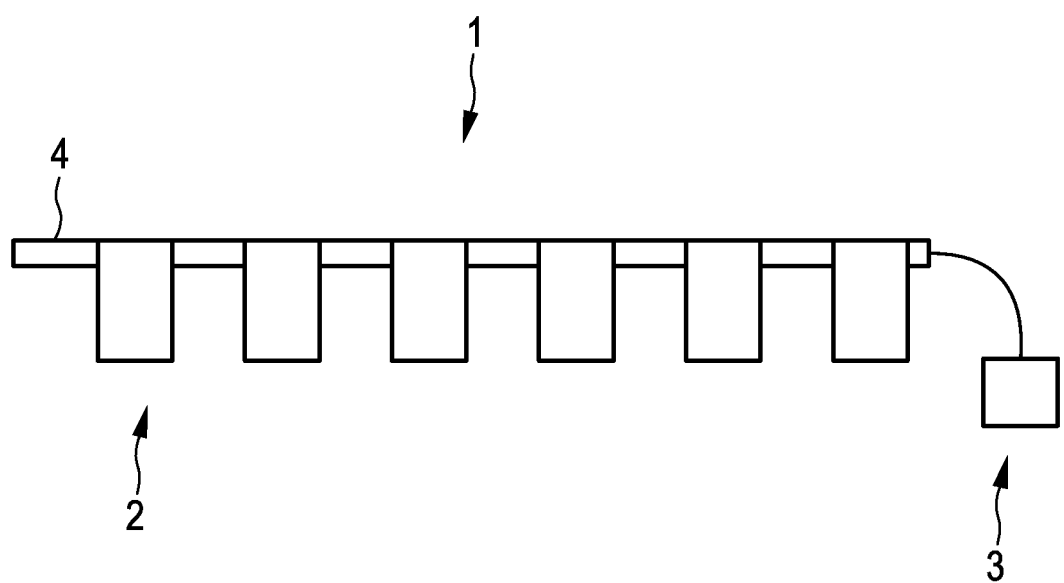
FIG. 1 shows schematically and exemplarily an embodiment of a DC power distribution system.

FIG. 1 shows schematically and exemplarily an embodiment of a DC power distribution system 1 for distributing DC power to several electrical devices 2. The electrical devices 2 are attached to an electrical conductor 4 of the DC power distribution system 1. The electrical conductor 4 is a power bar, wherein the DC power distribution system 1 further comprises a power supply device 3, which is electrically connected to the power bar 4, for providing the DC power to the power bar 4. The power bar 4 with the electrical devices 2 may be arranged at a ceiling of a room and the electrical devices 2 may be lamps such that the DC power distribution system can be a lighting system for illuminating a room.

Figure 2:
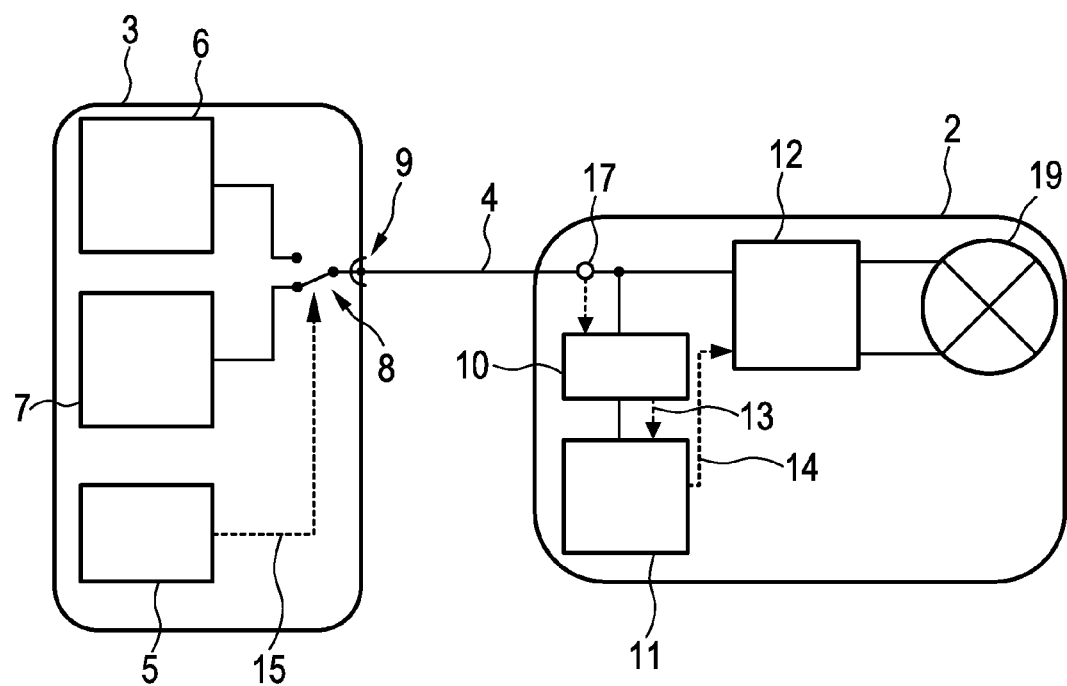
FIG. 2 shows schematically and exemplarily embodiments of a power supply device and an electrical device of the DC power distribution system.

An embodiment of a power supply device 3 and of an electrical device 2 is schematically and exemplarily shown in FIG. 2. The power supply device 3 is operable in a high power mode, in which a higher power is supplied to the electrical device 2 via the power bar 4, and in a low power mode, in which a lower power is supplied to the electrical device 2 via the power bar 4. The electrical device 2 is switchable between a high power mode, in which the electrical device 2 consumes more power, and a low power mode, in which the electrical device 2 consumes less power, wherein the electrical device 2 comprises an electrical device control unit 11 for controlling the mode of the electrical device 2 depending on the power supplied by the power supply device 3. In this embodiment the low power mode is a standby mode of the electrical device 2 and the high power mode is an active mode of the electrical device 2, in which the electrical device is fully operable. Correspondingly, the lower power supplied by the power supply device 3 is a standby power and the higher power supplied by the power supply device 3 is a nominal power. In particular, the power supply device 3 can be output voltage controlled such that in the low power mode a standby voltage of, for instance, 5 V and in the high power mode a nominal voltage of, for instance, 24 V is supplied.

The power supply device 3 comprises a high power supply 6 for supplying the higher power to the power bar 4 and a low power supply 7 for supplying the lower power to the power bar 4, wherein in the high power mode the high power supply 6 supplies the higher power and in the low power mode the low power supply 7 supplies the lower power. In particular, in the low power mode the high power supply 6 is completely switched off.

In this embodiment the power supply device 3 comprises a power supply control unit 5 for controlling a switch 8 by using a switching signal 15, i.e. via the power supply control unit 5 and the switch 8 the power supply device 3 can be controlled such that either the high power supply 6 supplies the higher power or the low power supply 7 supplies the lower power. The power supply control unit 5 can be a microprocessor or another control unit. It can receive switching signals from an external switch which may be actuated by a user, from a sensor like a presence sensor or from another means such that the power mode may be changed automatically or manually. The DC power distribution system 1 can also comprise a power consumption sensor, which may be integrated into the power supply device 3 or which may be an external device, and which can detect the power consumption condition on the power bar 4, wherein the power supply control unit 5 can be adapted to actuate the switch 8 depending on the actually detected power consumption condition. The power supply device 3 further comprises a connector 9, in particular a channel connector, for connecting the power supply device 3 to the power bar 4.

The electrical device 2 comprises a measuring unit 17 for measuring the power supplied by the power supply device 3, wherein the electrical device control unit 11 is adapted to control the mode of the electrical device 2 depending on the measured supplied power. In particular, the measuring unit 17 can be adapted to measure the voltage on the power bar 4, wherein the measured voltage is provided to a control supply 10. The control supply 10 can be adapted to compare the measured voltage with a predetermined threshold value, in order to determine whether the power supply device 3 supplies the nominal voltage or the standby voltage. If the control supply 10 has detected that standby voltage is supplied, this is signaled to the electrical device control unit 11 via the signal 13, whereupon the electrical device control unit 11 sends a signal 14 to a lamp supply 12 to switch itself off, if the lamp supply 12 is not already switched off. If the lamp supply 12 is switched off and if the electrical device control unit 11 receives a signal 13 from the control supply 10 indicating that the nominal voltage is supplied, the electrical device control unit 11 sends a signal to the lamp supply 12 to switch itself on.

The control supply 10 comprises preferentially a power converter for converting the power supplied via the power bar 4 to a power required by the electrical device control unit 11. The lamp supply 12 comprises preferentially also a power converter, wherein this power converter is adapted to convert the nominal power, if present, to a power required by a light source 19 of the electrical device 2.

Figure 3:
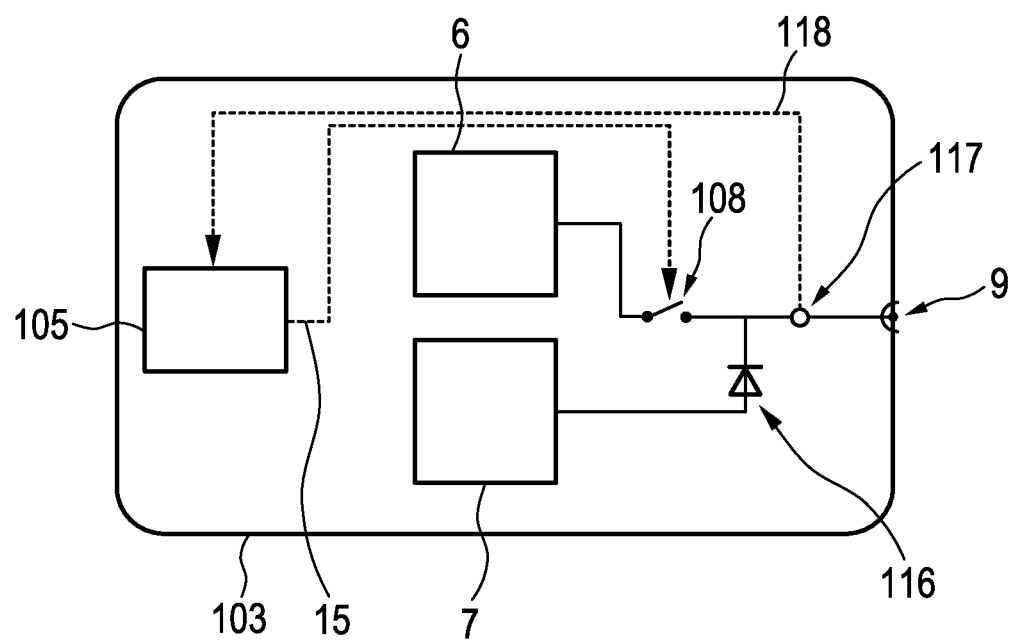
FIG. 3 shows schematically and exemplarily a further embodiment of a power supply device of the DC power distribution system.

FIG. 3 shows schematically and exemplarily a further embodiment of the power supply device which can be used in the DC power distribution system 1 schematically and exemplarily shown in FIG. 1, i.e. instead of the power supply device 3 shown in FIGS. 1 and 2 the power supply device 103 shown in FIG. 3 can be used.

The power supply device 103 comprises a high power supply 6 for supplying the higher power, in particular, for supplying the nominal voltage, to the power bar 4 and a low power supply 7 for supplying the lower power, in particular, the standby voltage, to the power bar 4, wherein in the high power mode the high power supply 6 supplies the higher power and the low power supply 7 supplies the lower power and wherein in the low power mode the low power supply supplies the lower power. Thus, in this embodiment only the high power supply 6 needs to be switched, thereby providing the controllable power supply device 103 in a technically relatively simple way. In particular, the power supply device 103 comprises a power supply control unit 105 for controlling a switch 108 for switching only the high power supply 6, whereas the low power supply 7 is always active and connected to the power bar 4 via a diode 116. In this embodiment the power supply device 103 further comprises a power consumption detection unit 117 for detecting the power consumed on the power bar 4, wherein the power supply control unit 105 is adapted to control the power mode of the power supply device 103 depending on the detected consumed power. The power supply control unit 105 can comprise switching rules defining a switching operation depending on the detected power consumption. For instance, the power supply device 3 can be switched into the low power mode, if the power consumption detection unit 117 detects a power consumption being smaller than a predefined threshold, wherein this detected power consumption can be provided to the power supply control unit 105 via a corresponding signal 118. A further signal 15 is used for controlling the switch 108 by the power supply control unit 105. The switching rules used by the power supply control unit 105 can also consider further aspects like timing aspects. The power consumption detection unit 117 can be, for example, a load current monitor for monitoring the load current on the power bar 4, wherein a corresponding load current signal 118 is transmitted to the power supply control unit 105. Also in this embodiment the power supply device is connected to the power bar 4 via a channel connector 9.

Although in the embodiment of the power supply device shown in FIGS. 2 and 3 the high power supply 6 and the low power supply 7 are integrated into a single housing, i.e. into a single power supply module, if the low power supply 7 is always active as described above with reference to FIG. 3, the low power supply 7 may also be arranged in a separate different housing such that the low power supply 6 and the high power supply 7 are arranged in different housings. For instance, in FIG. 3 the low power supply 7 and the diode 116 can be removed, wherein the low power supply 7 and the diode 116 can be connected to the power bar 4 as schematically and exemplarily shown in FIG. 4.

Figure 4:
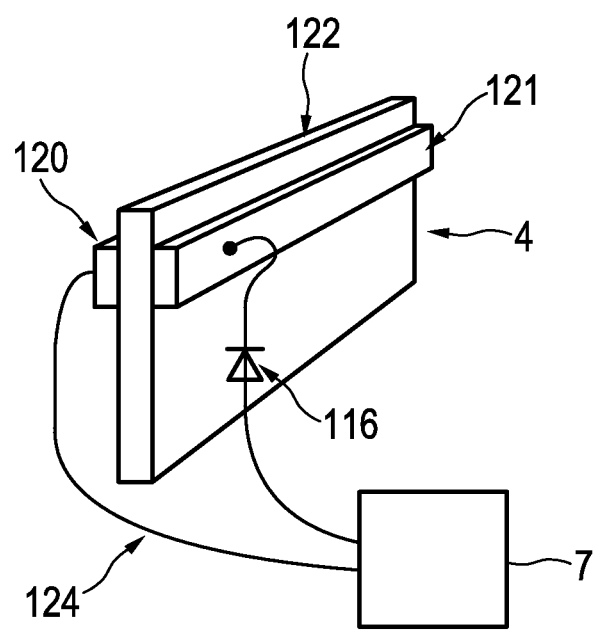
FIG. 4 shows schematically and exemplarily an electrical connection of a low power supply to a power bar.

FIG. 4 shows the power bar 4 in more detail as comprising a base element 122 to which a first sub conductor 120 and a second sub conductor 121 are attached, wherein the low power supply 7 and the diode 116 can be electrically connected to the first and second sub conductors 120, 121 via wires 124. The diode 116 can also be integrated into an electrical conductor connector 123, which is adapted to connect the power bar 4 with the low power supply 7, as schematically and exemplarily shown in FIG. 5. Moreover, if the DC power distribution system comprises several power bars, which have to be connected to the low power supply 7, this electrical connection can be in a bus configuration as schematically and exemplarily shown in FIG. 5 or, for instance, in a star configuration.

Figure 5:
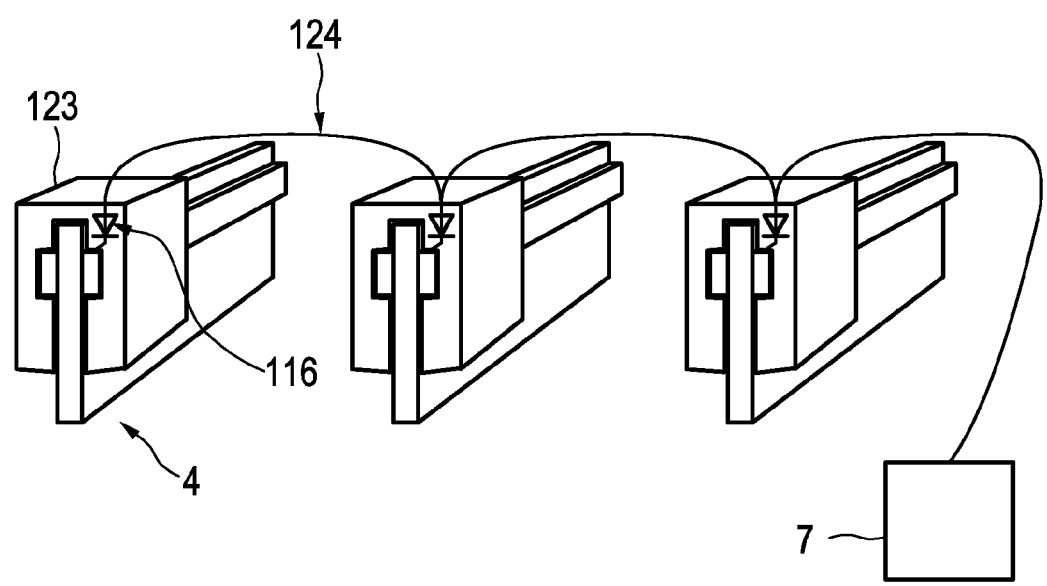
FIG. 5 shows schematically and exemplarily an electrical connection of a low power supply to several power bars.

In FIG. 5 the cables 124 can be premounted to a number of power bar connectors 123 or the cables can be pressfitted to power bar connectors 123 or clamped at mounting time.

Although in the embodiments shown in FIGS. 4 and 5 the power bar 4 comprises two sub conductors 120, 121, the power bar can also comprise more than two sub conductors. For instance, as schematically and exemplarily shown in FIG. 6, in an embodiment the power bar, which is indicated by reference number 204 in this figure, can comprise six sub conductors 230 . . . 236.

In this embodiment the base element 222 comprises at its upper part two sub conductors 230, 231 on opposing surfaces. These sub conductors 230, 231 are similar to the sub conductors 120, 121 shown in FIGS. 4 and 5. Directly below and parallel to these sub conductors further sub conductors 235, 236 are arranged. Moreover, the lower part of the base element 222 comprises an open rail 234, which may have a substantially U-shaped cross section, wherein even further sub conductors 232, 233 are arranged on opposing surfaces inside of the open rail 234. It should be noted that in FIG. 6 the dotted sub conductors 231, 232, 236 are arranged on sides of the base element 222, which would in real not be visible in the perspective view shown in FIG. 6.

In this embodiment, the first sub conductor 230 provides the ground, the second sub conductor 231 provides the nominal voltage of, for instance, 24 V, the third sub conductor 235 provides a first standby voltage of, for instance, 5 V and the fourth sub conductor 236 provides a second standby voltage of, for instance 3.3 V, i.e. the power bar 204 comprises the sub conductor 231 for conducting the higher power and the sub conductors 235, 236 for conducting lower powers.

Thus, for instance, a first low power supply of the power supply device can be electrically connected to, for instance, the third sub conductor 235, a second low power supply of the power supply device can be electrically connected to, for instance, the fourth sub conductor 236 and a high power supply of the power supply device can be electrically connected to the second sub conductor 231, wherein the electrical devices can be correspondingly adapted to be connected to the different sub conductors of the power bar. For example, a microprocessor of an electrical device may be electrically connected to the third sub conductor 235 or the fourth sub conductor 236 and a light source may be electrically connected to the second sub conductor 231. Generally, if an electrical device comprises several electrical elements requiring different voltages, the electrical elements can be electrically connected to the corresponding sub conductors of the power bar conducting the respective voltage.

Figure 6:
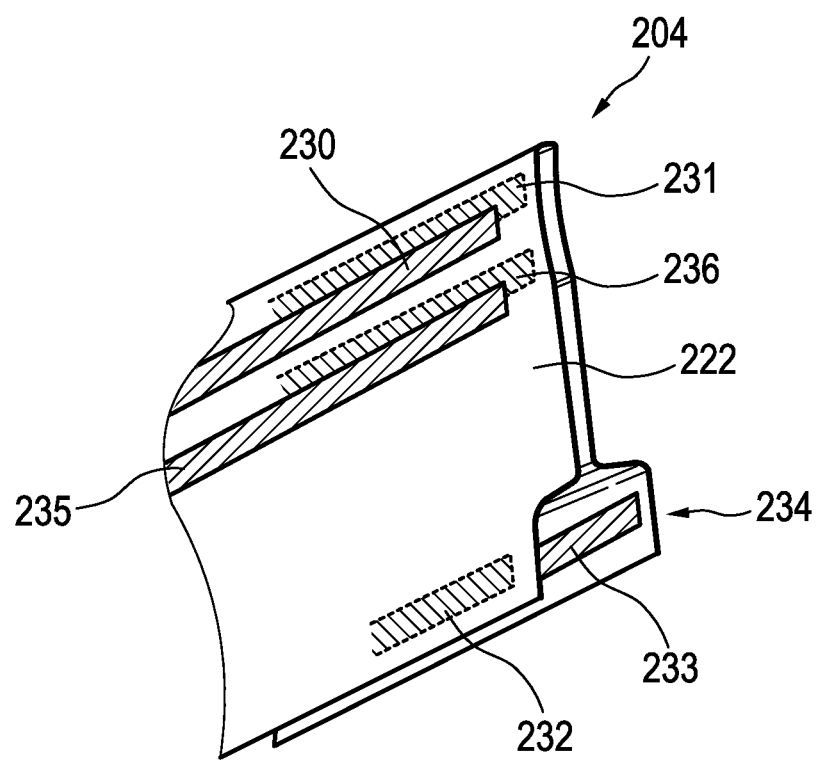
FIG. 6 shows schematically and exemplarily an embodiment of a power bar with several sub conductors.

The power bar 204 schematically and exemplarily shown in FIG. 6 is preferentially installed at a suspended ceiling of a room, wherein at least some of the electrical devices electrically connected to the power bar 204 are lamps. The sub conductors 230, 231, 235, 236 can be used for electrically connecting lamps above the suspended ceiling, wherein these lamps can comprise, for instance, a four pole connector for connecting the lamps to the four sub conductors 230, 231, 235, 236. The further sub conductors 232, 233 can be used for electrically connecting lamps, which hang inside the room like pendulum lamps, wherein these lamps can comprise, for instance, a two pole connector for connecting the lamps to the two sub conductors 232, 233. In further embodiments, alternatively or in addition, also adjacent to the lower sub conductors 232, 233 one or more sub conductors can be arranged providing a lower voltage. Moreover, instead of the above described two additional sub conductors 235, 236 the power bar can also only comprise a single sub conductor for providing a single lower voltage.

Figure 7:
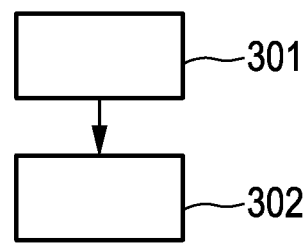
FIG. 7 shows a flowchart exemplarily illustrating an embodiment of a DC power distribution method for distributing DC power to an electrical device.

In the following an embodiment of a DC power distribution method for distributing DC power to an electrical device will exemplarily be described with reference to a flowchart shown in FIG. 7.

In step 301 DC power is supplied to an electrical device via an electrical conductor by a power supply device, wherein the power supply device is operable in a high power mode, in which the higher power is supplied to the electrical device via the electrical conductor, and in a low power mode, in which the lower power is supplied to the electrical device via the electrical conductor.

In step 302 the DC power from the electrical conductor is received by the electrical device, wherein the electrical device is switchable between a high power mode, in which the electrical device consumes more power, and a low power mode, in which the electrical device consumes less power, wherein the mode of the electrical device is controlled by an electrical device control unit depending on the power supplied by the power supply device.

Although in FIG. 1 only a single power bar is shown, the DC power distribution system can of course comprise several power bars, wherein the power supply device can be adapted to supply power to one or several of the power bars independently from supplying power to the other of the power bars.

A known DC power distribution system is, for instance, a system in accordance with the current EMerge Alliance Occupied Space standard revision 1.1 which requires that the power bars, which could also be regarded as being power rails, are constantly powered with 24 V, and a lamp supply, which may also be regarded as being a lamp driver, may have a means for deactivation and may have a control interface for controlling the deactivation. However, the DC power distribution system in accordance with the current EMerge Alliance Occupied Space standard revision 1.1 does not provide an efficient standby support. The embodiments of the DC power distribution system described above with reference to FIGS. 1 to 6 provide therefore a mechanism making standby supply simple and highly efficient.

Standby situations are system states with no substantial load. As the current EMerge Alliance Occupied Space standard revision 1.1 requires the power bars to be always powered at the nominal voltage, the power supply device has to work normally, even if only a very small fraction of power is consumed in comparison to nominal power consumption conditions. Thus, even if an electrical device is able to manage a standby mode such that the power consumption drops drastically, in accordance with the current EMerge Alliance Occupied Space standard revision 1.1 the power supply device will still operate in a very unfavorable point of operation, at which the efficiency easily drops, for instance, below 10 percent.

The power supply device described above with reference to FIGS. 1 to 3 can be adapted to totally switch off the main supply, i.e. the high power supply, and to place a reduced voltage on the power bars. The electrical devices can then easily distinguish the standby mode from the normal mode by the conditions on the respective power bar alone. The DC power distribution system described above can therefore be regarded as comprising a modified EMerge power supply device and a modified EMerge electrical device, for instance, as shown in FIGS. 2 and 3.

The power supply device may comprise two power supply sections, i.e. the high power supply and the low power supply. Firstly, the high power supply, which can also be regarded as being a normal power supply, can be able to supply the loads, i.e. the electrical devices, in an on condition. The normal power supply preferentially supplies 24 V at 4 A, i.e. 96 W, in particular per connecting channel, i.e. per power bar, if several power bars are connected to the high power supply. Secondly, the low power supply may be a separate supply for standby operation. This may be connected to an output connector of the power supply device, preferentially whenever the output is controlled into the standby mode.

Although in above described embodiments the power supply device comprises only two power supplies, i.e. the high power supply supplying preferentially a nominal voltage and the low power supply supplying preferentially a standby voltage, in other embodiments the power supply device can also comprise more than two power supplies supplying different DC voltages.

Although in above described embodiments the electrical devices are lamps, in other embodiments the electrical devices can also be other electrical loads like sensors, loudspeakers, et cetera. These other electrical devices may also be adapted to be fully operable at the standby voltage.

In an embodiment, whenever the standby mode gets disabled in the power supply device, the power supply device can switch back to the nominal EMerge supply voltage of 24 V and the respective electrical device goes into an active state, for instance, a lamp supply reactivates its on mode such that a light source starts burning. A power bar can therefore be switched off, if all electrical devices connected to the power bar are switched off. In an embodiment, this is detected by monitoring the current, wherein, if the monitored current falls below a predefined, in particular programmable, threshold value, the respective channel is set to the standby mode. The switching between the high power supply and the low power supply is preferentially separate for each channel, i.e. for each power bar. Thus, the current monitoring and the control of the switch can be separate for each channel.

In an embodiment, the electrical device can be operated differently in its active state. For instance, if the electrical device is a lamp, in the active state the lamp can be operated in different on modes defined by different light wavelengths and/or different light intensities. The electrical device can comprise a storing unit for storing the last on mode, wherein, after the electrical device goes from a standby state to an active state, the electrical device can be controlled to be in the stored last on mode.

Standby supply, i.e. the low power supply, and the main supply, i.e. the high power supply, may be implemented by single supply modules which supply all channels. As a current monitoring and switching means for isolating a channel in case of overload, i.e. above 4 A in accordance with the current EMerge standard UL-Class2 limitation, is required for each channel, this standby function does not necessarily require additional components or power with respect to the main supply. That means the main supply can comprise several ports, to which different power bars can be connected, i.e. to each port a power bar can be connected.

Current monitoring and switching means can be present in accordance with the actual EMerge standard UL-Class2 limitation for monitoring the current and for switching the high power on or off for each port separately. The current monitoring hardware used for detecting an overload condition can also be used for detecting whether a standby situation is present at the respective port, i.e. on the respective power bar, wherein in this case the switching means can switch off the supply of the higher power, i.e., for instance, the supply of the nominal voltage, for the respective channel. Moreover, each power bar can be connected in parallel to the standby supply over a diode such that, if the higher power for the respective channel is switched off, the lower power is provided to the respective channel. Instead of the diode also another element having a similar function can be used like a semiconductor switch with a control unit known as synchronous rectifier stage.

The power supply device can also be adapted to have the lower power and the higher power internally available for providing the lower power and/or the higher power and to switch between the lower power and the higher power separately for each channel, if several power bars are connected to the power supply device. That means the power supply device may comprise several ports, to which the power bars can be connected, wherein each port may be switchable separately between the lower power and the higher power.

Although in above described embodiments the power supply device comprises a high power supply and a low power supply, in another embodiment the power supply device may comprise a single power supply having a controllable output power to be supplied to the power bar for supplying the higher power in the high power mode and the lower power in the low power mode. In particular, the power supply device can comprise a main supply that is modified to have a controllable output power, for instance, a controllable output voltage.

If the power supply device comprises a high power supply and a low power supply, the power supply device can be adapted to switch one of the power supplies off, whenever the respective power mode is not used by any of the output channels, i.e. by any of the power bars.

If instead of a double pole switching means a simple on/off switch for the high power supply is used as schematically and exemplarily shown in FIG. 3, per port, i.e. per power bar, a diode can be used to supply the lower power, in particular, the standby voltage, always to all ports, i.e. always to all power bars. So whenever the main power for a power bar gets switched off, the standby voltage will remain.

The DC power distribution system may be used in combination with a control system like ZigBee. This control system can allow for switching individual electrical devices, in particular, individual lamps, on and off. Moreover, if all electrical devices on a particular EMerge channel, i.e. on a particular power bar, are off, the power supply device could detect the corresponding low power consumption condition and automatically switch to the low power mode, for instance, based on predefined switching rules which may consider timing.

In the current EMerge Alliance Occupied Space standard revision 1.1 power bars are used as shown in FIGS. 4 and 5, which can carry a maximum load in terms of power dissipation defined by standard and safety regulations. All electrical devices carrying a microprocessor, a sensor or other steering electronics need to convert the voltage on the respective power bar to a lower voltage of, for instance, 3.3 and 5 V. This means that generally each connected electrical device with the slightest form of intelligence needs an own DC/DC power converter for its operation.

The power bar with the several electrical sub conductors shown in FIG. 6 can be used to supply simultaneously different voltages to the electrical devices. For instance, the third and fourth sub conductors 235, 236 can be used for 3.3 and 5 V. In this way, for instance, microcontrollers of electrical devices can be active without power conversion.

The conduction of the different voltages by the different sub conductors can simplify communication and active microcontroller activity, while the high power supply providing the higher power is switched off. Moreover, the power supply device can also be adapted to provide an additional lower power in the high power mode, i.e., for instance, the nominal voltage can be provided by using a sub conductor of the power bar and a lower voltage, which may be regarded as being an auxiliary voltage, can be provided by using another sub conductor of the power bar. By using the different sub conductors for providing also the auxiliary voltage, the auxiliary voltage of, for instance, 5 V DC does not need to be generated locally by the respective electrical device by converting the nominal voltage to the auxiliary voltage. In other words, the auxiliary voltage can be generated centrally, which may lead to a reduction in hardware components and power consumption as conversion steps can be skipped.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

The control of the DC power distribution system in accordance with the DC power distribution method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to a DC power distribution system for distributing DC power from a power supply device to an electrical device. The power supply device is operable in a high power mode or in a low power mode for supplying a higher power or a lower power, respectively, to the electrical device via an electrical conductor, wherein the electrical device is switchable between a high power mode and a low power mode in which the electrical device consumes more power or less power, respectively. An electrical device control unit controls the mode of the electrical device depending on the power supplied by the power supply device. This automatic control of the electrical device depending on the provided power can lead to a better balance between the power consumption and the power supply and, thus, to an improved efficiency of supplying power to the electrical device.

The invention claimed is:

1. A DC power distribution system for distributing DC power from a power supply device to an electrical device, the DC power distribution system comprising:
an electrical conductor being a power bar for conducting DC power from the power supply device to the electrical device,
the power supply device for supplying DC power to the electrical device via the electrical conductor, wherein the power supply device is operable in a high power mode, in which a higher power is supplied to the electrical device via the electrical conductor, and in a low power mode, in which a lower power is supplied to the electrical device via the electrical conductor,
the electrical device for receiving DC power from the electrical conductor, wherein the electrical device is switchable between a high power mode, in which the electrical device consumes more power, and a low power mode, in which the electrical device consumes less power, wherein the electrical device comprises an electrical device control unit for controlling the mode of the electrical device depending on a measured power supplied by the power supply device, wherein the electrical device control unit switches to the high power mode if the measured power is above a predetermined threshold value and switches to the low power mode if the measured power is below the predetermined threshold value.

2. The DC power distribution system as defined in claim 1, wherein the electrical device comprises a measuring unit for measuring the power supplied by the power supply device, wherein the electrical device control unit is adapted to control the mode of the electrical device depending on the measured supplied power.

3. The DC power distribution system as defined in claim 1, wherein the power supply device comprises a high power supply for supplying the higher power to the electrical conductor and a low power supply for supplying the lower power to the electrical conductor, wherein in the high power mode the high power supply supplies the higher power and in the low power mode the low power supply supplies the lower power.

4. The DC power distribution system as defined in claim 1, wherein the power supply device comprises a high power supply for supplying the higher power to the electrical conductor and a low power supply for supplying the lower power to the electrical conductor, wherein in the high power mode the high power supply supplies the higher power and the low power supply supplies the lower power and wherein in the low power mode the low power supply supplies the lower power.

5. The DC power distribution system as defined in claim 4, wherein the low power supply and the high power supply are in different housings.

6. The DC power distribution system as defined in claim 4, wherein the low power supply is connected to the electrical conductor via an electrical control element .

7. The DC power distribution system as defined in claim 6, wherein the electrical control element is integrated in an electrical conductor connector for connecting the electrical conductor with the low power supply.

8. The DC power distribution system as defined in claim 4, wherein the DC power distribution system comprises several electrical conductors, wherein the low power supply is connected to the several electrical conductors in a bus or star configuration.

9. The power distribution system as defined in claim 1, wherein the higher power is a nominal power of the DC power distribution system and the lower power is a standby power of the DC power distribution system.

10. The power distribution system as defined in claim 1, wherein the power supply device comprises a power consumption detection unit for detecting the power consumed on the electrical conductor and a power supply control unit for controlling the power mode of the power supply device depending on the detected consumed power.

11. The DC power distribution system as defined in claim 1, wherein the DC power distribution system comprises several electrical conductors and wherein the power supply device is adapted to supply power to one or several of the electrical conductors independently from supplying power to the other of the electrical conductors.

12. The DC power distribution system as defined in claim 1, wherein the electrical conductor comprises a first sub conductor for conducting the higher power and a second sub conductor for conducting the lower power.

13. An electrical device for receiving DC power from an electrical conductor being a power bar of a DC power distribution system as defined in claim 1, wherein the electrical device is switchable between a high power mode, in which the electrical device consumes more power, and a low power mode, in which the electrical device consumes less power, wherein the electrical device comprises an electrical device control unit for controlling the mode of the electrical device depending on the power on the electrical conductor .

14. An electrical conductor being a power bar for conducting DC power from a power supply device to an electrical device in a DC power distribution system as defined in claim 1, wherein the electrical conductor comprises a first sub conductor for conducting the higher power and a second sub conductor for conducting the lower power.

15. A DC power distribution method for distributing DC power from a power supply device to an electrical device, the DC power distribution method comprising:
supplying DC power to the electrical device via an electrical conductor being a power bar by the power supply device, wherein the power supply device is operable in a high power mode, in which the higher power is supplied to the electrical device via the electrical conductor, and in a low power mode, in which the lower power is supplied to the electrical device via the electrical conductor,
receiving DC power from the electrical conductor by the electrical device, wherein the electrical device is switchable between a high power mode, in which the electrical device consumes more power, and a low power mode, in which the electrical device consumes less power, wherein the mode of the electrical device is controlled by an electrical device control unit depending on a measured power supplied by the power supply device, wherein the electrical device control unit switches to the high power mode if the measured power is above a predetermined threshold value and switches to the low power mode if the measured power is below the predetermined threshold value.

* * * * *